United States Patent [19]

Pine

[11] Patent Number: 4,840,267
[45] Date of Patent: Jun. 20, 1989

[54] METHOD AND APPARATUS FOR CLEANING A CONVEYOR BELT

[75] Inventor: Bob G. Pine, Chagrin Falls, Ohio
[73] Assignee: Applied Techniques Inc., Chagrin Falls, Ohio
[21] Appl. No.: 1,913
[22] Filed: Jan. 9, 1987
[51] Int. Cl.$^4$ .............................................. B65G 45/00
[52] U.S. Cl. .................................... 198/498; 198/499; 15/256.5
[58] Field of Search ............... 198/498, 494, 497, 496, 198/499, 493; 15/256.5

[56] References Cited

U.S. PATENT DOCUMENTS

| | | | |
|---|---|---|---|
| 3,583,555 | 6/1971 | Karsnak et al. | 198/495 |
| 3,815,728 | 6/1974 | Vaughan | 198/495 |
| 4,180,155 | 12/1979 | Stevick | 198/498 |
| 4,280,616 | 7/1981 | Wadensten | 198/499 |
| 4,365,706 | 12/1982 | Bright | 198/499 |

FOREIGN PATENT DOCUMENTS

| | | | |
|---|---|---|---|
| 2310491 | 9/1974 | Fed. Rep. of Germany | 198/498 |
| 2082133 | 3/1982 | United Kingdom | 198/445 |

OTHER PUBLICATIONS

Cottrell Conveyor Belt Cleaner, Motherwell Control Systems, Inc., Minneapolis, MN.
Advanced Techniques Conveyor Belt Cleaner, Advanced Techniques, Chagrin Falls, Ohio.
Surfbelt, Inc., New Hopper Mount, 9-24-78, McKeesport, PA.
Surfbelt Belt Cleaner Brochure, Surfbelt, Inc., McKeesport, PA.
Drawings for 11015 Series Surfbelt "SSB" Model, Surfbelt, Inc., McKeesport, PA.
Surfbelt 11015 Series HSB Model, Surfbelt, Inc., McKeesport, PA.

Primary Examiner—Robert J. Spar
Assistant Examiner—Cheryl L. Gastineau
Attorney, Agent, or Firm—Wayne D. Porter, Jr.

[57] ABSTRACT

A method and apparatus for cleaning a conveyor belt includes placing a rotatable cleaning roller in close proximity with the belt. The roller includes a plurality of radially extending vanes configured in the form of a so-called chevron helix. The roller is supported within a frame member, which in turn is attached to the support structure of the conveyor. The frame member includes an adjusting mechanism which adjusts the position of the belt relative to the roller. A sealing arrangement establishes an effective air seal between the roller and the belt to permit a vacuum source to aid in the removal of material from the belt.

15 Claims, 9 Drawing Sheets

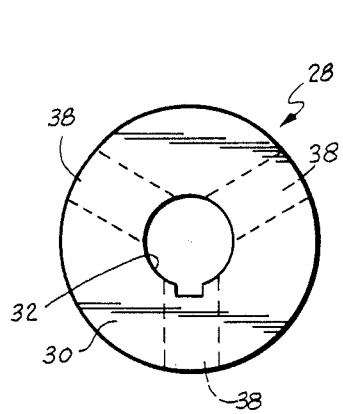 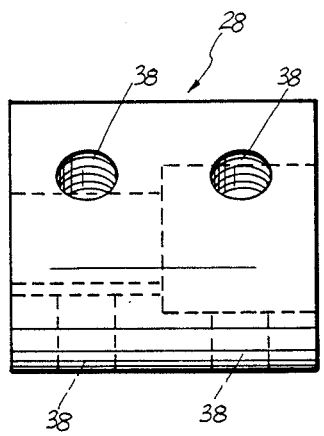 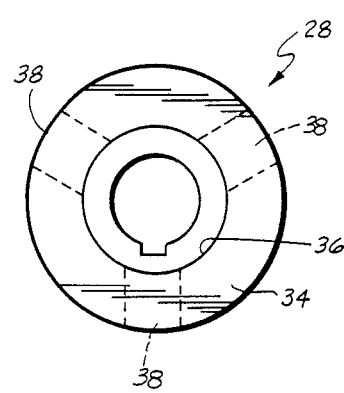
FIG. 7  FIG. 7A  FIG. 7B
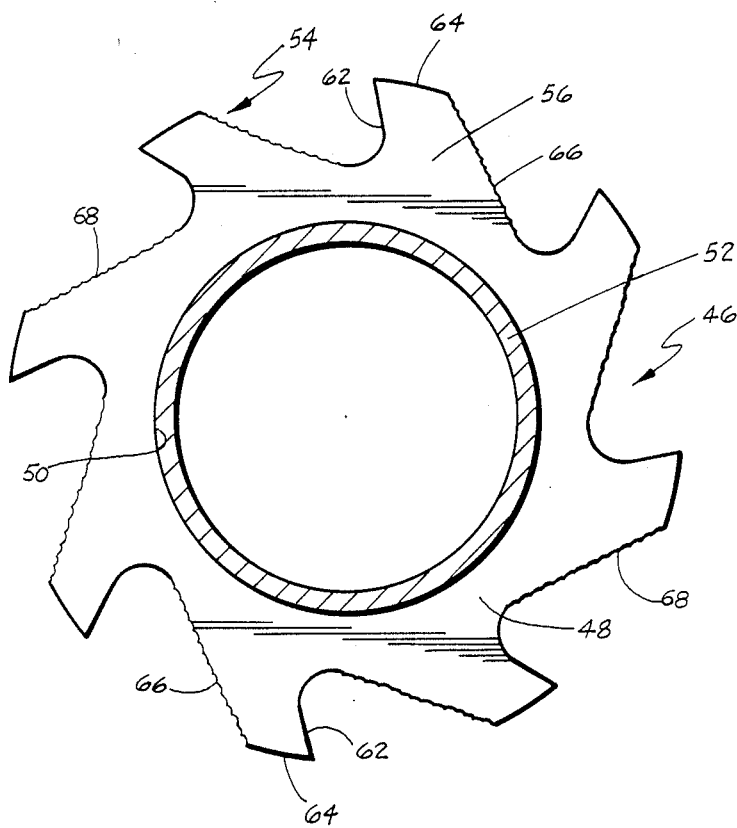
FIG. 9

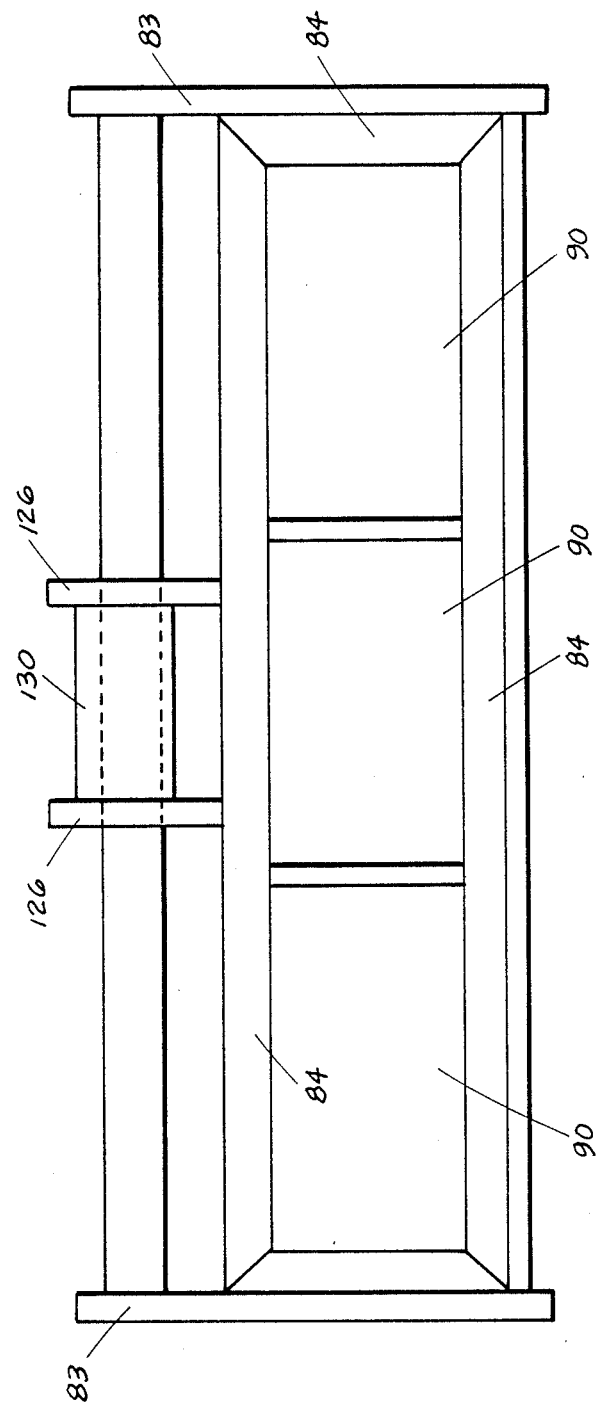

METHOD AND APPARATUS FOR CLEANING A CONVEYOR BELT

BACKGROUND OF THE INVENTION

1. Field of the Invention

This invention relates to a method and apparatus for cleaning a conveyor belt and, more particularly, to a cleaning roller and its operation.

2. Description of the Prior Art

As has been well known for many years, conveyor belts have been used in a wide variety of machines, and in various applications, primarily to convey articles or material from one point to another. A problem associated with conveyor belts is the build-up of residue which occurs when certain materials are being conveyed. Conveyor belts for materials such as coal, coke, woodchips and the like continuously collect and retain residue after discharge of the bulk of the conveyed material from the conveyor. A portion of this residue material is deposited onto idler and support pulleys as well as various other mechanisms, thereby creating maintenance problems and high operating costs. As a result of this residue problem, various cleaning devices have been used to scrape or otherwise clean the residue from the conveyor belt. These scraping and cleaning devices have included brushing mechanisms, scrapers, knife-edges, rotary drums, flexible blades and the like which all contact the conveyor in some manner, and which engage the residue material deposited thereon to remove it from the conveyor.

A representative cleaning device is disclosed in U.S. Pat. No. 3,583,555, which utilizes a contacting roller to engage the surface of the conveyor belt. The contacting roller is rotated in a direction opposite to the path of travel of the conveyor belt. A single set of helical formation having specifically configured serrations along their top face are rotated at a high rate of speed to engage and remove the residue deposited on the conveyor. This particular mechanism has been marketed by Surfbelt, Inc. of McKeesport, Pa. for cleaning large industrial conveyors which carry coke, coal, woodchips and the like.

A number of drawbacks are inherent in the referenced device which, by their very nature, limit the use of this conveyor cleaner to only large industrial applications. The cleaner utilizes an offset drive motor which, through a sprocket and drive belt, rotates the contacting roller. An adjustment mechanism moves the contacting roller, frame member and motor relative to the conveyor. The frame member is extremely cumbersome and heavy due to the various members it must support. The adjustment mechanism employs a number of tension springs and adjustable mounting brackets which must move in order to maintain contact between the conveyor and contacting roller. Accordingly, the mechanism is quite large and is only capable of coarse adjustments due to the requirement that it be capable of adjusting the position of the heavy contacting roller and frame member. The referenced device cannot be used in applications where small positional adjustments may be necessary.

Further, the contacting roller is provided with helical formations which extend about the roller. These formations cause the generation of a force, as the contacting roller engages the conveyor belt, in a direction parallel to the contacting roller's axis of rotation. This force tends to make the roller and belt move relative to each other in a direction perpendicular to the path of the conveyor. This force generation requires a large frame member to restrain any resultant movement of the contacting roller.

Another known conveyor belt cleaner employs a coaxially aligned drive motor and contacting roller. Although the overall weight and size of the frame member is decreased, it still remains relatively large in order to accommodate spring-loaded slip-plates which move the contacting roller, drive motor, and entire assembly relative to the conveyor in an effort to maintain sufficient contact between the conveyor and the roller. Further, the frame member also is large in order to withstand the axial force inherently generated by the single set of helical formations.

SUMMARY OF THE INVENTION

The present invention overcomes the aforementioned problems and provides an efficient and relatively lightweight conveyor belt cleaner which can be used in many types of conveyor belt environments, particularly those where the size and strength of the support structure is of crucial importance.

The apparatus of the present invention includes a frame member having a rotatable cleaning roller. The frame member further includes a drive motor engageably connected to the cleaning roller and an adjusting means for displacing the conveyor relative to the cleaning roller to maintain sufficient spacing therebetween. The cleaning roller is provided with first and second sets of helical formations which extend in opposite directions for even loading of forces along the roller.

In accordance with another aspect of the present invention, an improved method for removing material from a conveyor belt includes positioning a cleaning roller in contacting or near-contacting relation to the material deposited on the belt. As the belt moves past the roller, the roller is rotated so that material is removed from the belt. As this cleaning action takes place, the belt may be moved relative to the roller so as to maintain a sufficient distance therebetween. Because the belt is moved relative to the roller and not vice-versa, positional adjustments can be made with great accuracy.

BRIEF DESCRIPTION OF THE DRAWINGS

The foregoing and other objects, advantages and characterizing features of the present invention will become clearly apparent from the ensuing detailed description of an illustrative embodiment thereof, taken together with the accompanying drawings wherein like reference numerals denote like parts throughout the various views and in which:

FIGS. 7, 7A, 7B are front, side and rear views, respectively, of a drive coupling member;

FIG. 8 is a bottom view of the central housing member;

FIG. 9 is a side view of the cleaning roller, taken partially in cross-section.

DETAILED DESCRIPTION OF THE PREFERRED EMBODIMENT

Figure 1:
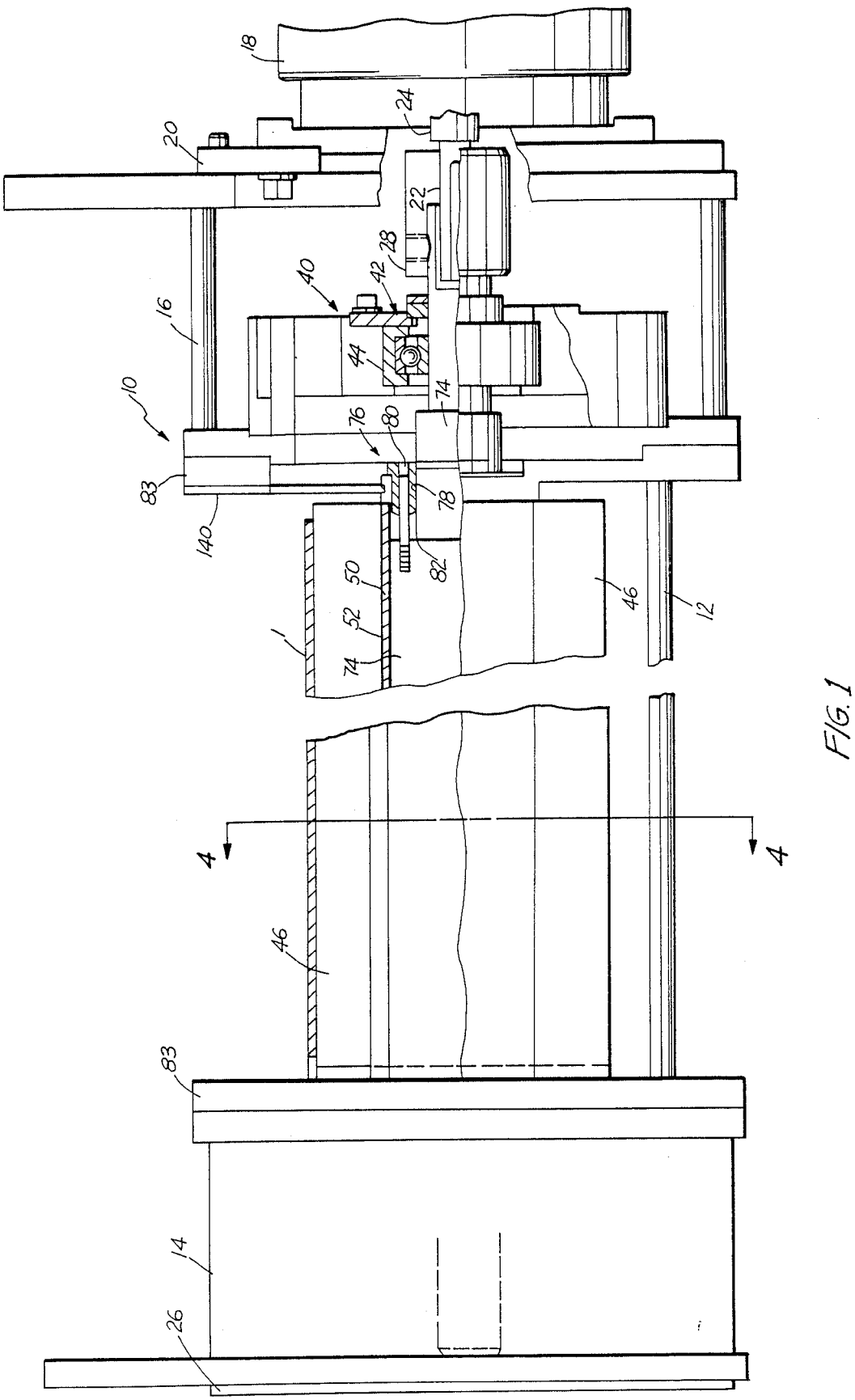
FIG. 1 is a front view, with portions broken away and partially in cross-section, of a conveyor belt cleaner incorporating the features of the present invention.

Referring now in detail to the Figures, and in particular FIG. 1, apparatus for cleaning a conveyor belt 1 is shown. The belt 1 is a flexible, sheet-like member having an imperforate surface suitable for conveying materials such as cereals, powders, and the like. The belt 1 is intended to convey any finely divided material or any material having a finely divided residue which would pass through a non-imperforate conveyor.

A frame member 10 includes a central housing member 12 and end housing members 14, 16. The housing members 14, 16 are substantially identical in outer configuration and are attached to the central housing member 12 by any well known fastening means. A motor drive unit 18 is attached to the end housing member 16 via a motor mount plate 20 with a drive motor shaft 22 extending into the end housing 16 through an opening 24 disposed in the motor plate 20. End housing 14 is typically provided with a transparent plastic viewing plate 26 which enables an operator to view the internal configuration of the end housing 14. End housing members 14, 16 are identically configured to enable the motor drive unit 18 to be attachable to either of members 14, 16 as may be desired for a particular application. Consequently, only the internal mechanism of end housing member 16 will be described and shown in detail.

End housing member 16, as shown particularly in FIG. 1, includes a drive coupling member 28 which receives the drive motor shaft 22, which, in turn, extends into the end housing member 16. The drive coupling member 28, as particularly shown in FIGS. 7, 7A and 7B, includes a first end or front face 30 which has a keyway opening 32 for receiving the drive motor shaft 22, and a second end or rear face 34 which has a larger keyway opening 36. Radially extending threaded openings 38 open into the keyway openings 32, 36. A fastening means, typically set screws (not shown), is provided to fixedly attach the drive coupling member 28 to the drive motor shaft 22 so that on rotation of the shaft 22, the drive coupling member 28 also rotates. The drive coupling member 28 is typically made from a hard, yet flexible, plastic vibration-dampening material to aid in decreasing vibrations caused by the rotation of the drive motor shaft 22.

A bearing block 40 is disposed on the side of the drive coupling member 28 opposite to the drive motor unit 18. The bearing block 40 includes the internal configuration of a typical shaft bearing including a ball bearing arrangement 42 and a rubber casing 44 to provide a support bearing through which a shaft extends for rotation with a minimum amount of vibration. The bearing block 40 is fastened to the end housing member 16 through any well known fastening means (not shown).

Figure 10:
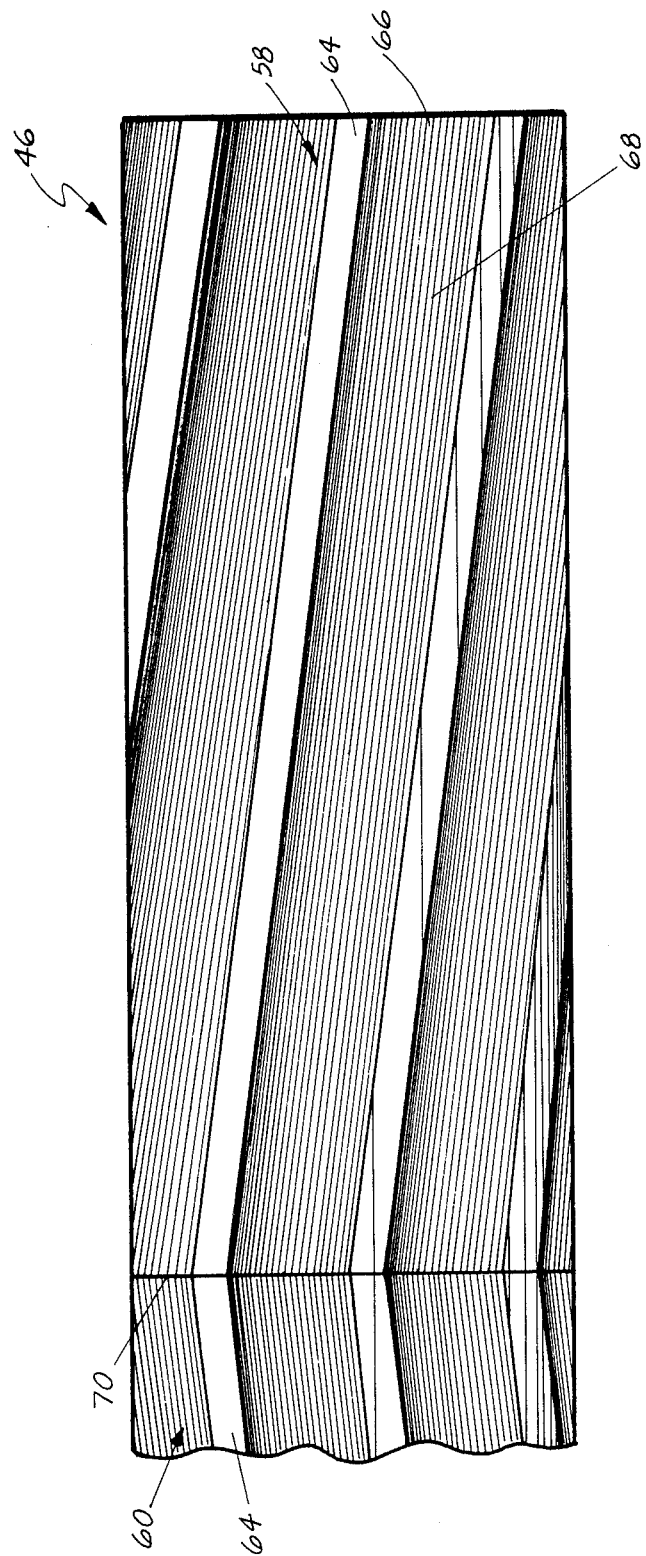
FIG. 10 is a front view of a portion of the cleaning roller showing first and second sets of helical configurations.

As shown in FIGS. 1, 9 and 10, a cleaning roller 46 is disposed between, and rotatably attached to, the end housing members 14, 16. The roller 46 has a body portion 48 substantially cylindrical in shape and a bore 50 longitudinally extending through the length thereof. Bonded to the body portion 48 and positioned in the bore 50 is a sleeve 52, which is normally made of steel or aluminum. The body portion 48 has a plurality of vanes 54 radially extending from the outer periphery 56 of the body portion 48. As particularly shown in FIGS. 9 and 10, the vanes 54 are generally trapezoidal in shape and include a leading eall 62, a top face 64, and a trailing wall 66. The trailing wall 66 includes a means for directing the flow of material from the contacting roller 46. The directing means is a series of narrowly spaced ribs 68 integrally formed into the trailing wall 66.

The vanes 54 are configured in a so-called chevron helix. First and secoond sets 58, 60 of the vanes 54 emanate from central forming plane 70. The second set 60 extends in a first direction, or counterclockwise, about the outer periphery 56 of the roller 46 as measured from the forming plate 70. Likewise, the first set 58 also emanates from the forming plane 70 in a second direction, or clockwise, about the outer periphery 56 as measured about the forming plane 70. In a preferred embodiment, each set 58, 60 includes eight vanes having a pitch of approximately 1.75 inches. The number, pitch, and relative height of the vanes 54 may vary according to application. Further, although the vanes 54 may be made of any suitable material, in this particular preferred embodiment the vanes are made of urethane which has been FDA-approved for use in contact with consumable foodstuffs.

Figure 5:
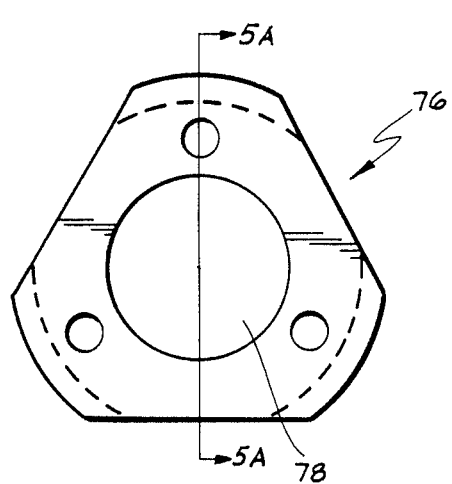
FIG. 5 and 5A are top and side views, respectively, of a shaft centering means.
Figure 5A:
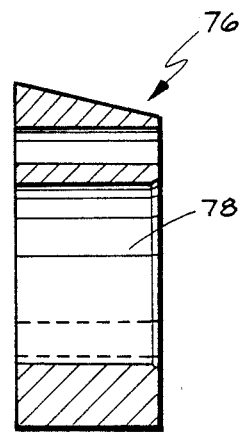

The roller 46 is further provided with a step-down shaft 74 longitudinall extending throughout the length of the sleeve 52 and laterally projecting into the end housing members 14, 16. A centering means or taper member 76 is provided for securely aligning the shaft 74 with the central longitudinal axis of rotation of the roller 46. As particularly shown in FIGS. 5 and 5A, the centering means includes a taper member 76 which has a bore 78 through which the shaft 74 extends. The centering means or taper member 76 is disposed about the shaft 74 and is forced between the shaft 74 and the sleeve 52. Because of the symmetrical configuration provided by the taper member 76, the shaft 74 becomes automatically centered about the rotational axis of the roller 46. The tapered configuration of the taper member 76 provides an effective friction seal between the shaft 74 and the sleeve 52. Bolts 80 (FIG. 1), preferably three of which are equidistantly spaced about the periphery of the taper member 76, are provided to connect the taper member 76 directly to the shaft 74 by way of threaded openings 82. In this manner, upon rotation of the drive motor shaft 22, the drive coupling 28, via the keyway 32, is caused to rotate. Keyway 36 receives the shaft 74 which is, in turn, rotated by the drive coupling 28. The bearing block 40, through which the shaft 74 extends, provides some vibration dampening. Through this linkage mechanism, the roller 46 rotates upon activation of the drive motor 18.

It should be understood that the frame member 10, drive motor 18, and roller 46 are all axially aligned and are fixedly attached or linked to prevent any relative movement therebetween. Further, the frame member 10 can be easily attached to any suitable conveyor support assembly (not shown).

Disposed about the roller 46 is the central housing member 12 which is shown particularly in FIGS. 1, 3, 4, and 8. The central housing member 12 is attached to the frame member 10 by any well known fastening means via border plates 83 and is generally U-shaped in configuration. The central housing member 12 includes a base 84 having curved wall portions 86 and 88 attached to and projecting therefrom so as to partially encase the roller 46. The base 84 has a plurality of openings 90 disposed therein through which residue from the belt 1 can be removed. If desired, a vacuum source (not shown) can be connected to the openings 90 in order to assist the residue-removal process. Plates 92, 94 are connected to the side walls 86, 88, respectively. As particularly shown in FIG. 4, plate 92 is movable positioned on a flange 96 and has an edge 98 which rests in close proximity to the top faces 64 of the vanes 54. This relationship provides an effective air seal between the plate 92 and the roller 46. Likewise, the plate 94 is movable positioned on a flange 100 while having a curved edge 102 which is in close proximity to the belt 1, thereby creating an effective air seal between the plate 94 and the belt 1. If suction is applied to the central housing member 12, air can be removed effectively from the vicinity of the roller 46. This is highly desirable because such a vacuum would aid in the removal of the residue from the belt 1 as well as the roller 46 and would increase the overall efficiency of the roller 46.

Figure 2:
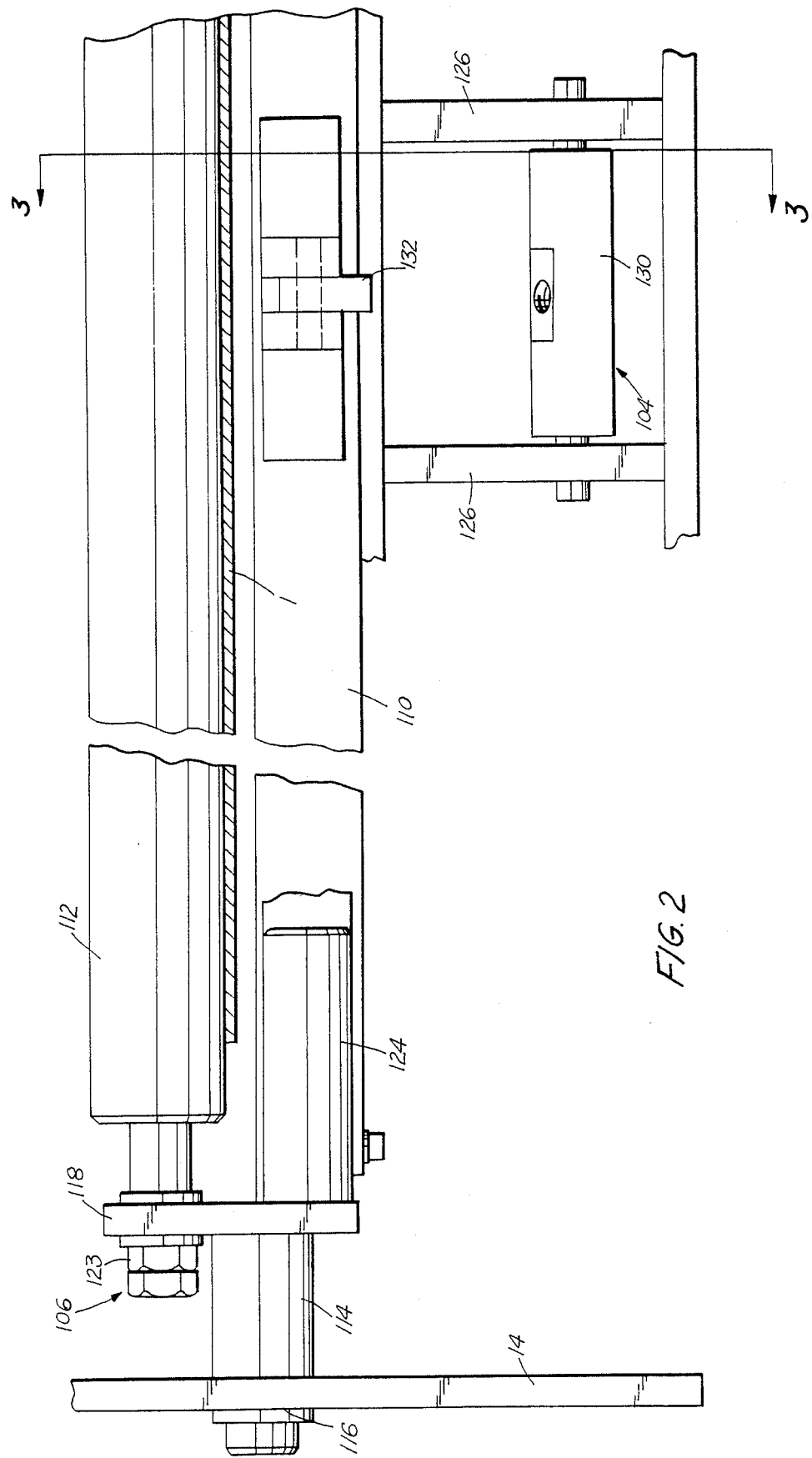
FIG. 2 is a front view, with portions broken away and partially in cross-section, of a central housing member and a conveyor displacing member of the present invention.
Figure 6:
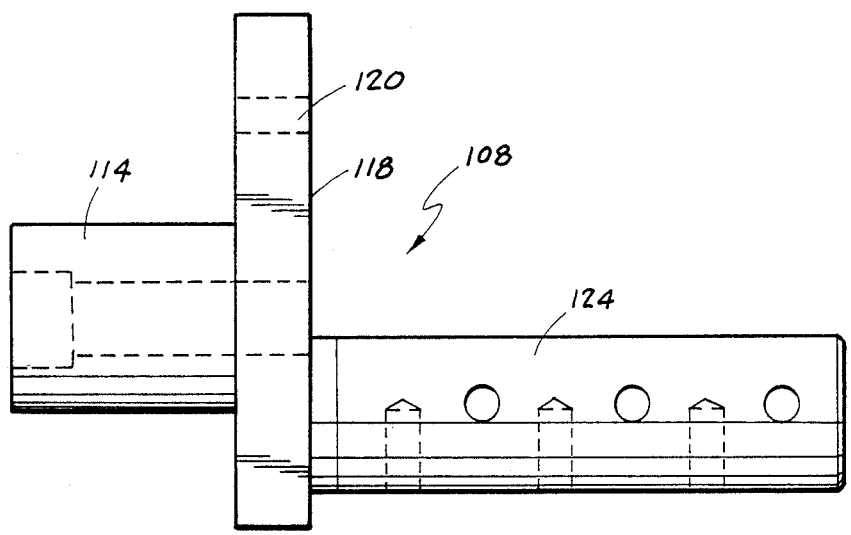
FIG. 6 is a side view of an end receptacle.

A biasing means 106 is attached to the central housing member 12, via an adjusting means 104 and the end housing members 14, 16. The biasing means 106 includes an end receptacle 108, a conveyor displacing member or bar 110, and a roller 112. As particularly shown in FIGS. 2 and 6, the end receptacle 108 includes a body portion 114 which is rotatably connected to the end housing members 14, 16 at point 116 through any well known means; a plate portion 118 which includes an opening 120 through which the biasing roller 112 extends and is fixedly attached thereto via a bolted arrangement 123; and a bar receiving means 124 to which the bar 110 is fixedly attached by any well known fastening means. The belt 1 passes between the bar 110 and the roller 112, with the bar 110 being disposed on that side of the belt adjacent the roller 46. Upon rotation of the bar 110 and the roller 112 about point 116, the roller 112 engages the belt 1 so as to bias the belt 1 toward roller 46.

Figure 3:
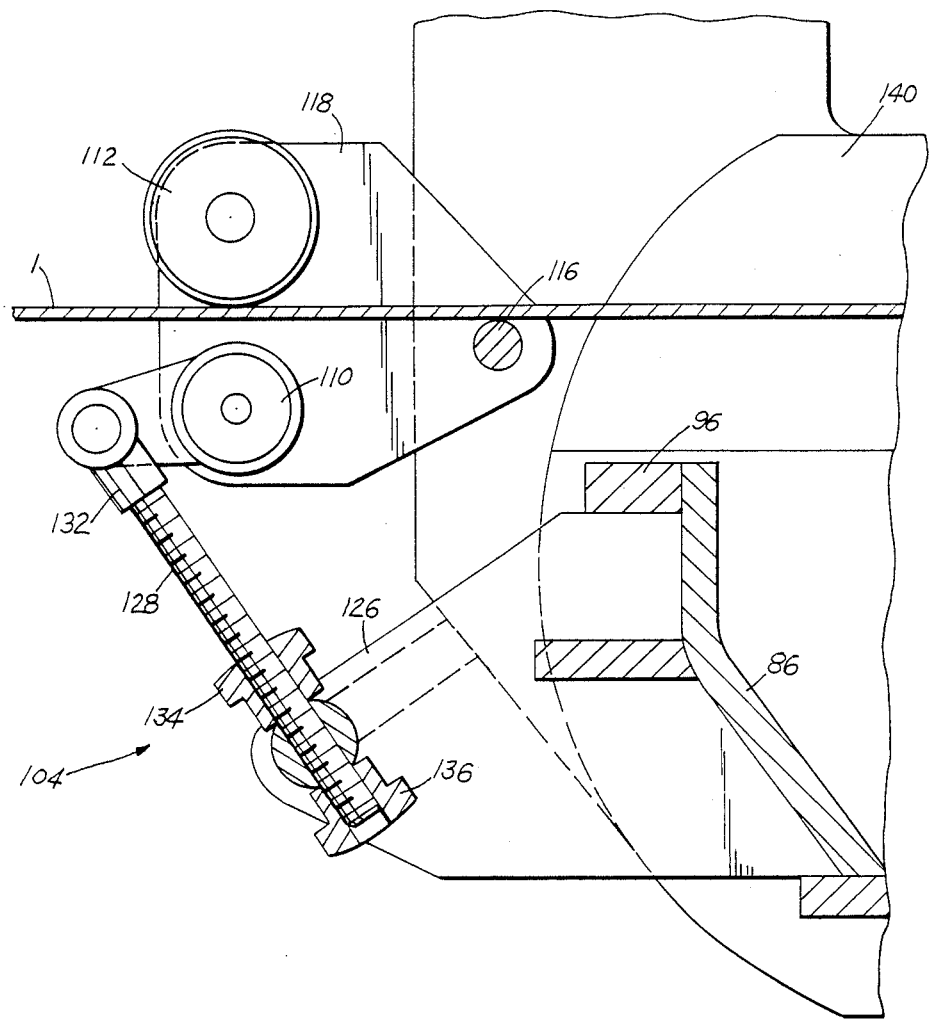
FIG. 3 is a side view, with portions broken away and taken partially in cross-section, of an adjusting mechanism and the conveyor displacing member.
Figure 3A:
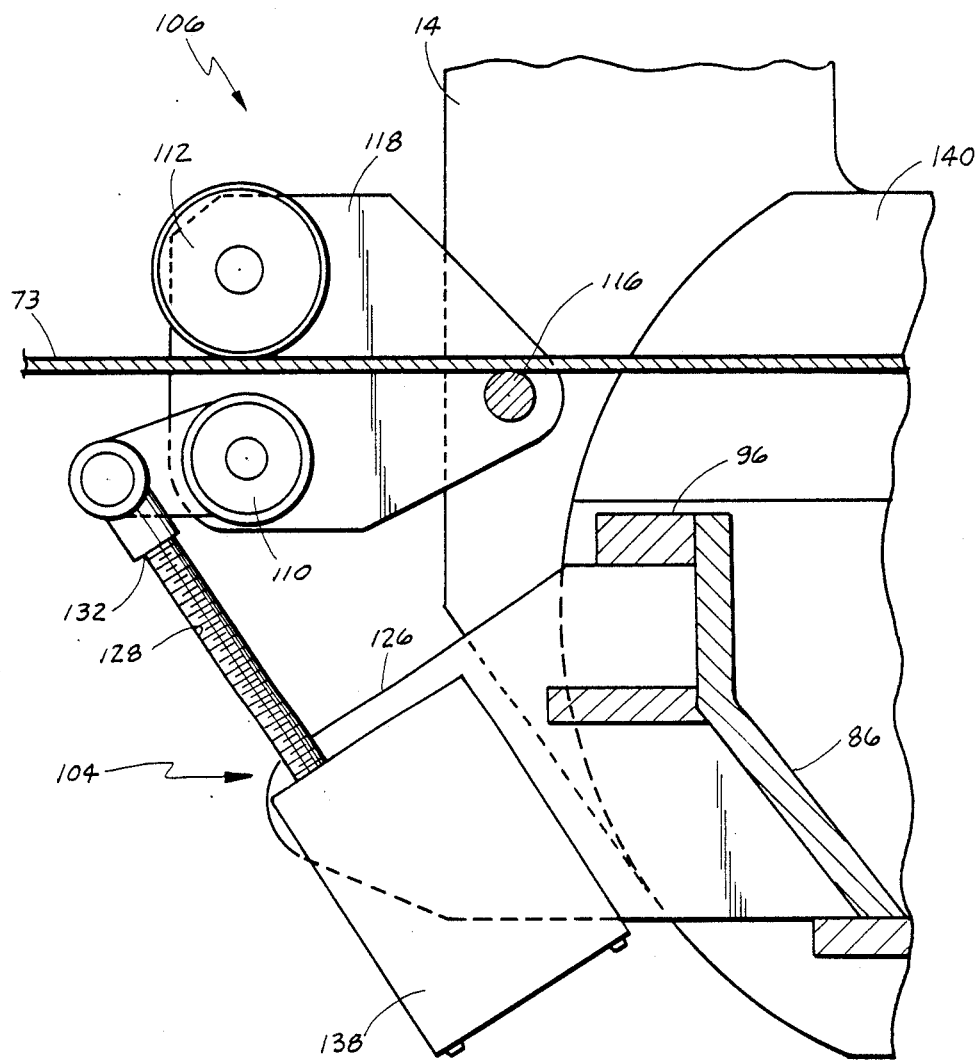
FIG. 3A is a side view, with portions broken away and taken partially in cross-section, of an alternate embodiment of the adjusting mechanism.
Figure 4:
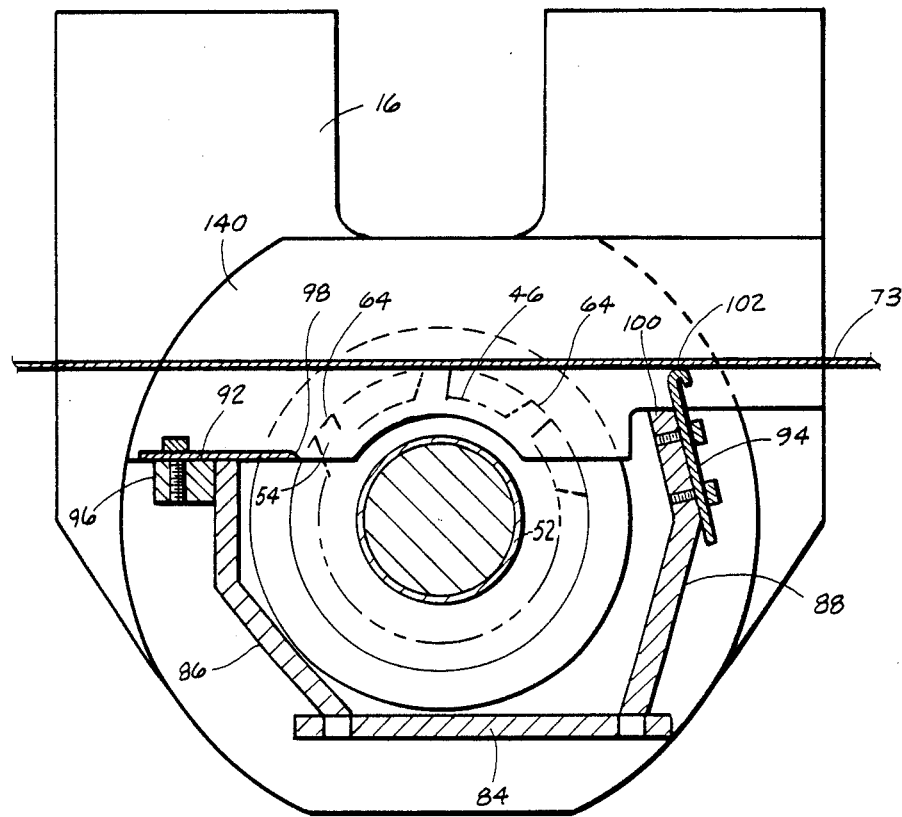
FIG. 4 is a side view, with portions broken away and taken partially in cross-section, of a cleaning roller and vacuum means of the present invention.

Centrally attached to the bar 110 is the adjusting means 104 which controls and regulates the amount of rotation about point 116 of the biasing means 106. As particularly shown in FIGS. 2, 3, 3a and 8, the adjusting means 104 includes a pair of anchor plates 126 which project from the central housing member 12, and which have disposed therebetween an incrementally advanceable shaft or threaded rod 128 adjustably attached to a base member 130. the rod 128 is attached to the bar 110 via a rod receiving member 132. Consequently, upon rotation of rod nuts 134, 136, the length of the rod 128 can be adjusted relative to the anchor plates 126. Upon advancing the rod 128, the bar 110, which is attached thereto by member 132, is caused to rotate about point 116. In this fashion, the rod 128 can be adjusted to rotate the bar 110 and roller 112 to move the belt 1 toward or away from the the vanes 54 of the roller 46. As shown in FIG. 3A, an optional drive motor 138 can be positioned between anchor plates 126. The motor 138 can be electrically activated to provide adjustment to the rod 128 in discrete increments of about 0.005 inch.

OPERATION

After appropriate assembly of the roller 146 into the end housing members 14, 16, the plate 92 is adjusted to provide an effective air seal about the roller 46. The entire frame member 10, including the assembled central housing unit 12, end housing members 14, 16 and drive motor 18 is bolted onto the conveyor support structure (not shown). The bar 110 is disposed adjacent the roller 46 while the roller 112 is disposed on that side of the belt 1 opposite the roller 46. Each end housing member 14, 16 includes a conveyor guard plate 140 which shields the frame member 10 and any operator thereof from the sides of the belt 1 during its operation. The adjusting means 104 is actuated to rotate the biasing roller 112 about pivot 116 to bias the belt 1 into contact with the roller 46. Once contact occurs, the plate 94 is adjusted to provide an effective seal between the belt 1 and the central housing unit 12. As the belt 1 begins to move, the drive motor 18 is engaged to rotate the roller 46 so that the vanes 54 rotate in a direction opposite to the path of travel of the belt 1. In most instances, the adjusting means 104 will be actuated to "Back off" the belt 1 about 0.002 inch from the roller 46 so as to minimize wear on both the belt 1 and the roller 46.

The vanes 54 contact the residue on the belt 1 such that the helical formations 58, 60 equally distribute any forces generated along the roller 46. As the residue is removed from the belt 1 by the action of the top faces 64 and the leading wall 62 against the residue, a vacuum begins to draw air and residue from around the roller 46 and through the openings 90 disposed in the central housing member 12. The narrowly spaced ribs 68, positioned along the trailing wall 66 also aid in directing the flow of residue from the belt 1.

During the ongoing operation of the roller 46, an operator can view the relationship between the belt 1 and the roller 46 through the transparent viewing plate 26 and an opening disposed in the border plate 83. By actuating the adjusting means 104, either manually or via the drive motor 138, the operator can adjust the belt 1 into a more preferred relationship with respect to the roller 46. Not only can the spacing between the belt 1 and the roller 46 be adjusted with great ease and accuracy, but the belt 1 can be cleaned across its width better than with prior belt cleaning devices. The latter result is made possible by the relatively close axial spacing between the rollers 112, 46 and by the fact that the rollers 112, 46 are parallel to each other. The flexible nature of the belt 1 is such that the belt is positioned parallel to the roller 46 immediately after leaving the roller 112. Accordingly, the belt 1 can be spaced equidistantly from the roller 46 across the entire width of the belt 1 even if the belt 1 is not parallel to the roller 46 upstream of the roller 112.

Although the invention has been described in its preferred form with a certain degree of particularity, it is to be understood that the present disclosure of the preferred embodiment has been made only by way of example and various changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. Apparatus for the removal of material disposed on a conveyor in the form of a flexible sheet-like, imperforate belt, comprising:
   a rotatable cleaning roller disposed adjacent one side of the belt, the cleaning roller extending across the wodth of the belt and being maintained in a stationary position relative to the belt;
   a biasing roller disposed on the opposite side of the belt from the cleaning roller, the biasing roller extending across the width of the belt and being movable relative to the belt and the cleaning roller for displacing the belt toward or away from the cleaning roller;
   a stationary frame member to which the cleaning roller is secured;
   end supports for the biasing roller, the end supports being mounted to the frame member for movement relative to the frame member;
   a connecting bar extending between and connected to the end supports, the connecting bar being disposed on that side of the belt closest to the cleaning roller; and
   a threaded, rotatable shaft in threaded engagement with the connecting bar and the frame for adjusting the position of the connecting bar relative to the belt.

2. The apparatus of claim 1, further comprising a motor connected to the frame for rotating the shaft.

3. The apparatus of claim 1, wherein the cleaning roller includes a plurality of radially extending vanes.

4. The apparatus of claim 3, wherein the vanes include a first set and a second set of circumferentially spaced helical formations projecting radially from the outer periphery of the cleaning roller.

5. The apparatus of claim 4, wherein the first set and the second set of helical formations extend generally parallel to the longitudinal axis of the cleaning roller from the mid-point of the roller, but wrap around the cleaning roller in opposite directions.

6. The apparatus of claim 3, wherein each vane includes a leading wall, a top face, and a trailing wall, the trailing wall having a means for directing a flow of material away from the cleaning roller.

7. The apparatus of claim 6, wherein the means for directing the flow of material includes a plurality of ribs extending longitudinally along the length of the trailing wall.

8. The apparatus of claim 1, further comprising:
   end supports for the cleaning roller; and
   means for maintaining the cleaning roller centered relative to the end support.

9. The apparatus of claim 8, wherein the means for maintaining the cleaning roller centered relative to the end supports includes:
   a shaft projecting from each end of the cleaning roller, the shaft being loosely fitted within the cleaning roller and in rotatable engagement with the end supports; and
   a circumferential tapered member disposed about the shaft at each end of the cleaning roller, the tapered member being wedged into the roller and against the shaft.

10. The apparatus of claim 1, further comprising a generally U-shaped housing member disposed about the cleaning roller on that side of the cleaning roller opposite the belt.

11. The apparatus of claim 10, further comprising further and second plates mounted to the housing member and extending across the width of the belt, the first and second plates adapted to create a relatively tight seal between the roller and the belt, respectively, the first plate including an edge adapted to be positioned in close proximity to the roller, and the second plate including an edge adapted to be placed in close proximity to the belt.

12. A rotatable cleaning roller for removing material disposed on a conveyor belt, comprising:
   first and second sets of circumferentially spaced helical formations projecting radially outwardly from the periphery of the roller, the first and second sets extending generally parallel with the longitudinal axis of the cleaning roller from the midpoint of the roller, the first and second sets wrapping around the cleaning roller in opposite directions; and
   each helical formation being in the form of a vane having a leading wall, a top face, and a trailing wall, the trailing wall having a means for directing a flow of material away from the cleaning roller, the means for directing the flow of material including a plurality of ribs extending longitudinally along the length of the trailing wall.

13. The apparatus of claim 1, wherein the biasing roller is disposed upstream of the cleaning roller in the direction of belt movement.

14. The apparatus of claim 11, wherein the first and second plates are movable relative to the roller and the belt, respectively, in order to adjust the spacings therebetween.

15. Apparatus for the removal of material disposed on a conveyor in the form of a flexible, sheet-like, imperforate belt, comprising:
   a rotatable cleaning roller disposed adjacent one side of the belt, the cleaning roller extending across the width of the belt and being maintained in a stationary position relative to the belt;
   a plurality of radiately extending vanes projecting from the cleaning roller, each vane including a leading wall, a top face, and a trailing wall, the trailing wall having a means for directing a flow of material away from the cleaning roller, the means for directing a flow of material including a plurality of ribs extending longitudinally along the length of the trailing wall; and
   a biasing roller disposed on the opposite side of the belt from the cleaning roller, the biasing roller extending across the width of the belt and being movable relative to the belt and the cleaning roller for displacing the belt toward or away from the cleaning roller.

* * * * *